Figure 1:
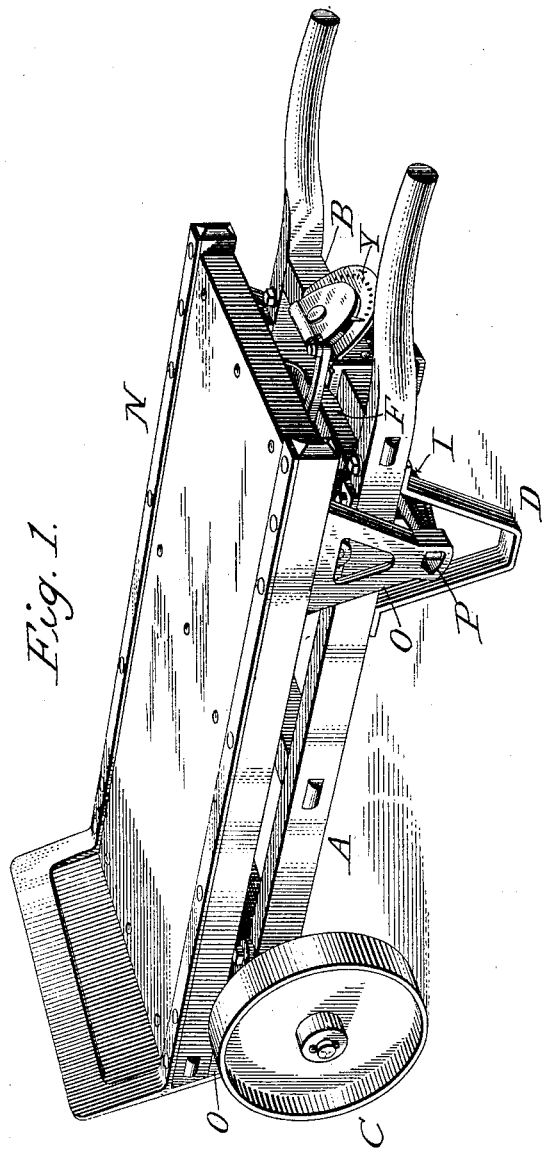

No. 656,729. Patented Aug. 28, 1900.
H. SAWYER.
WEIGHING TRUCK.
(Application filed Jan. 26, 1898.)
(No Model.) 4 Sheets—Sheet 1.

Attest;
W. C. Burdine
D. E. Burdine

Inventor;
Harry Sawyer,
by Dodge and Sons,
Attys.

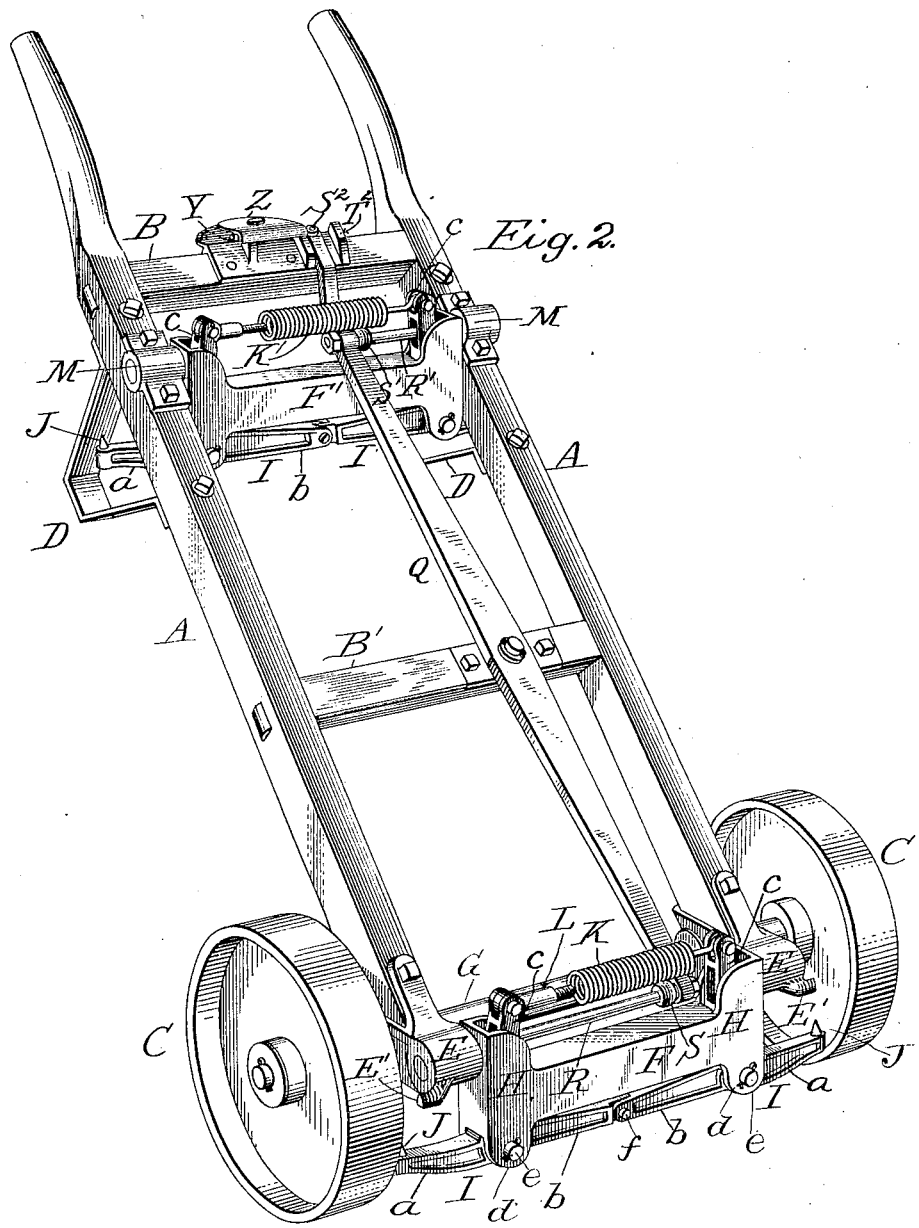

No. 656,729. Patented Aug. 28, 1900.
H. SAWYER.
WEIGHING TRUCK.
(Application filed Jan. 26, 1898.)
(No Model.) 4 Sheets—Sheet 3.
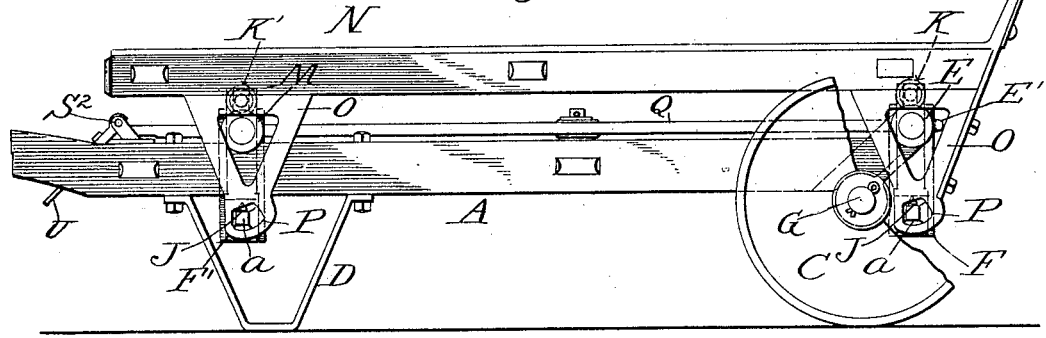
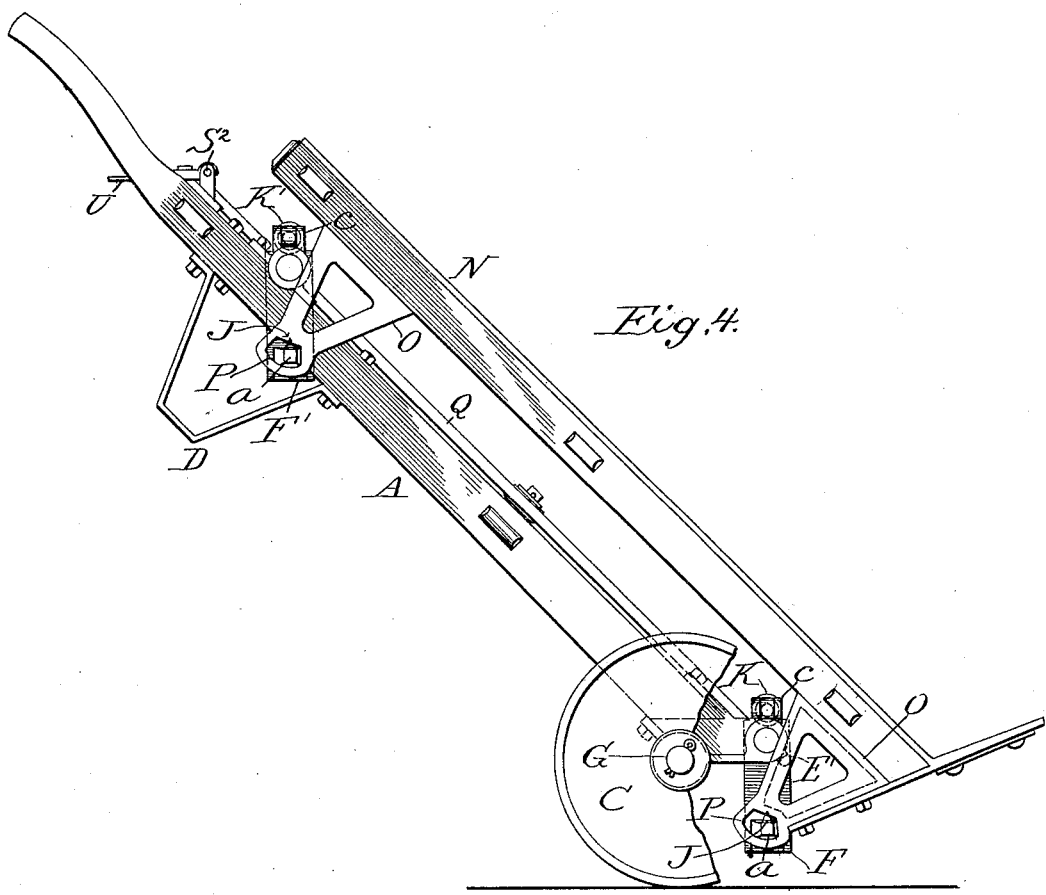

No. 656,729. Patented Aug. 28, 1900.
H. SAWYER.
WEIGHING TRUCK.
(Application filed Jan. 26, 1898.)
(No Model.) 4 Sheets—Sheet 4.
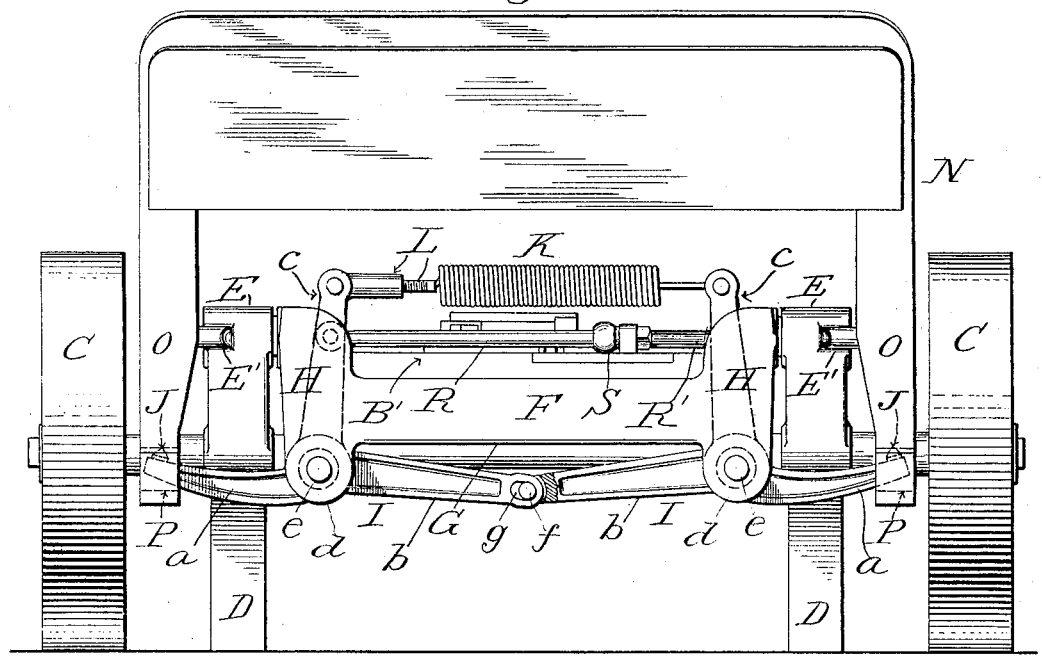
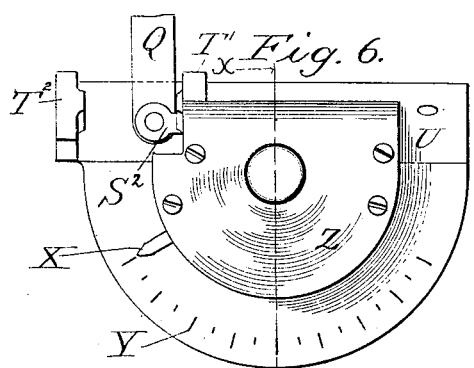
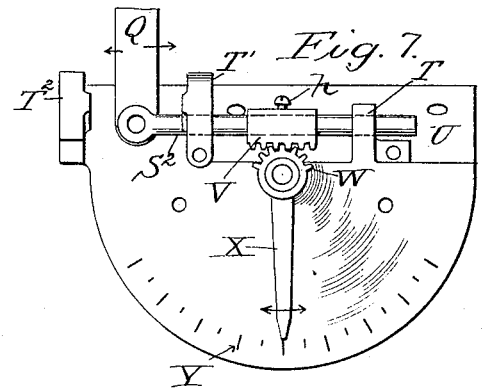
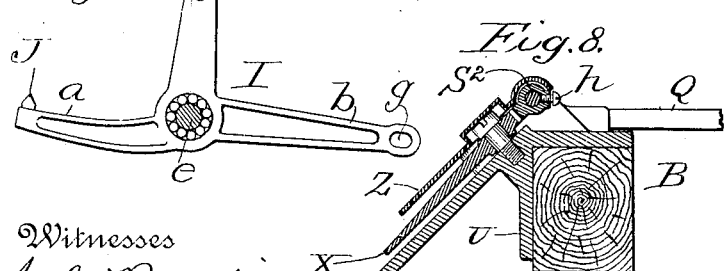
Witnesses
Inventor:
Harry Sawyer,
by Dodge and Sons
Attorneys.

UNITED STATES PATENT OFFICE.

HARRY SAWYER, OF MUSKEGON, MICHIGAN.

WEIGHING-TRUCK.

SPECIFICATION forming part of Letters Patent No. 656,729, dated August 28, 1900.

Application filed January 26, 1898. Serial No. 668,039. (No model.)

*To all whom it may concern:*

Be it known that I, HARRY SAWYER, a citizen of the United States, residing at Muskegon, in the county of Muskegon and State of Michigan, have invented certain new and useful Improvements in Weighing-Trucks, of which the following is a specification.

My invention pertains to that class of hand-trucks provided with weighing mechanism and commonly known at the present time as "weighing-trucks."

The invention consists in novel features, combinations, and details hereinafter set forth, whereby the scale or weighing device is enabled to operate freely and with accuracy with the truck in any position from horizontal to an angle of forty-five degrees to the horizon or thereabout. The construction is simple and the parts strong and durable, yet not so heavy as to increase the weight of the truck unduly.

The drawings accompanying and forming a part of this description illustrate my invention as embodied in a truck suitable for general use.

In the drawings, Figure 1 is a perspective view of the truck complete in a horizontal position; Fig. 2, a perspective view of the truck with the platform removed and the main frame raised to an angle of forty-five degrees, more or less; Fig. 3, a side elevation showing the truck in a horizontal position, with portions broken away to show the operative mechanism beyond; Fig. 4, a similar view, but with the truck raised to an angle of about forty-five degrees; Fig. 5, a front end elevation; Fig. 6, a top plan view of the dial and pointer; Fig. 7, a similar view with the top or cover plate removed; Fig. 8, a sectional view on the line $xx$ of Fig. 6; Fig. 9, a side elevation of one of the platform-supporting levers.

Various attempts have hitherto been made to produce weighing-trucks; but many of these have been incapable of weighing accurately except when the truck occupied a horizontal position. In practice trucks of this character are used in positions varying from horizontal to an angle of forty-five degrees, or even more, to the horizon, though there is seldom, if ever, occasion to weigh with them at any greater elevation than that mentioned.

My purpose is, as above suggested, to permit the weighing to be done with equal facility and accuracy with the truck in any position which it is likely to assume in ordinary use.

With this object in view I adopt the construction illustrated and which I will now explain in detail.

A main truck-frame, comprising side rails or bars A A and cross-bars B and B', is furnished with wheels C C, the latter carried upon the ends of an axle G, extending across the forward end of the frame and projecting beyond the sides thereof, as usual. Near the rear end of the frame and at or about the usual location of the feet of an ordinary truck there are provided feet or supports D, which are formed of heavy strap-iron and which are of open-V form, as shown in Figs. 1, 2, 3, and 4.

Bolted or otherwise secured to the forward ends of the side rails A A of the main frame of the truck are hangers or journal-boxes E E, in which are seated the journals of a pendulous frame F, preferably of hollow or box-like construction. The journal boxes or bearings are extended sufficiently forward of the axle G to permit the frame F to hang in a vertical position when the truck-frame is dropped to horizontal position, and being forward of said axle the frame F may of course maintain its vertical position when the truck-frame is elevated at its rear end.

The frame F consists of a horizontal main body and vertical end portions H, which latter are open from top to bottom and terminate at their lower ends in depending ears $d$, which ears receive the pivot pins or fulcrums $e$ of three-armed levers I. The levers are of the form best illustrated in Fig. 9 and consist, essentially, of three arms $a$, $b$, and $c$, uniting in a common hub which is provided with an opening to receive the pivot-pin $e$. The opening may be made sufficiently large to receive rollers or other antifriction devices, as indicated in Fig. 9, or any other suitable form of bearing may be adopted. The inwardly-extending arms $b$ of the levers I I are connected by a pin $f$, driven tight in perforations in the forked end of one lever and passing through an elongated opening $g$ in the arm $b$ of the other lever, as seen in Figs. 2 and 5. Of course a bolt or equivalent device may be employed. The outwardly-extending arms $a$ are provided with upwardly-projecting conical pins J, which form bearings for the depending legs or castings O of the platform N, these legs being of the form shown in Figs. 1, 3, and 4 of the drawings, with sector-shaped openings in their lower portions to permit them to encompass the ends of arms $a$ of the levers I and to rock or tip thereon to any extent necessary to maintain a proper relation of the parts in tipping the truck to any position from horizontal to an inclination of forty-five degrees, more or less. The upwardly-extending arms $c$ of the levers I I are connected by a strong spiral spring K, a suitable adjusting device L being interposed between the spring and one of the arms, so that it may be placed under the tension necessary to exactly balance so much of the weight of the platform as falls upon the levers I I at the forward end of the truck. Any common form of adjusting device may be employed, that shown in the drawings being simply a two-part connection, one part arranged to screw into the other a greater or less distance to vary the length of the connection and the consequent tension of the spring.

F' indicates a second pendulous frame, in all respects the same as frame F, but hung in journal-boxes M, located near the rear end of the truck-frame, as best shown in Fig. 2. The frame F' is provided with levers I' I', the same as those of frame F, and the upwardly-extending arms $c\ c$ are connected by a spring K', provided with an adjusting device L', as in the case of the spring K of frame F.

The platform N is provided with two pairs of legs or castings O O, each formed with an opening P to receive an arm $a$ of one of the levers I I or I' I'. In this way the platform will be supported at four points and upon a separate lever at each such point, and by reason of the pendulous arrangement of the frames F and F' and their hanging always in a vertical position it will be seen that the handles may be raised or lowered freely without affecting the leverage between the platform N and the weighing-springs. To prevent the platform N from being thrown too far forward in the event of the truck being lifted to too great an angle, the castings E are formed with ears or projections E', which fall within the boundaries of the forward legs O of the platform and against which the rear flanges or walls of said legs engage when the truck is raised to an angle of forty-five degrees or more, as indicated in Fig. 4.

At the rear end of the truck and in position to be conveniently read by the user there is a dial graduated to show in pounds or other units the weight placed upon the platform, an indicator being connected with the lever system and arranged to move over the dial to indicate thereon the load at any time upon the platform. The preferred mode of making the connection is best illustrated in Fig. 2, wherein is represented a lever Q, fulcrumed on the cross-bar B', connected at points equidistant from its fulcrum with the vertical arm $c$ of one of the levers I and one of the levers I'. The connections between the lever Q and the arms $c$ of the levers I and I' may be varied in form or construction; but I have represented and prefer to employ rods R and R', provided with ball-and-socket joints S and S', and to connect the rods R and R' with the arms $c$ of the respective levers at points in axial alinement with the journals of frames F and F', so that the connection shall be unaffected by the movements of the truck-frame and the frames F F' relatively to each other. The rear end of lever Q is carried upward over a casting comprising a dial-plate Y and a bracket or plate U to fit upon and to be secured to the cross-bar B of the truck-frame. The form of this bracket or casting is best seen in Figs. 1, 2, and 8. As shown in Figs. 6 and 7 the bracket is formed with three raised lugs T, T', and $T^2$, the lugs T and T' being perforated to receive and guide a rod $S^2$, which is jointed to the rear end of lever Q. The lugs T' and $T^2$ serve as stops to limit the play or movement of lever Q.

V indicates a sleeve adapted to encircle the rod $S^2$ and carried thereon at any convenient point by a set-screw $h$ or equivalent fastening, said sleeve being provided with teeth to mesh with a toothed sector W, formed upon or secured to a pointer or indicator X. The pointer X is arranged to sweep over the graduated dial Y, on which it is pivoted by a screw or other suitable fastening, the pointer and the toothed members V and W being covered and protected, except as to the extreme end of the pointer, by a covering-plate Z.

From the foregoing description it will be seen that in whatever position the truck may be placed within the range of actual use the parts will adapt themselves to such position and the platform will be free to rise or fall, as the load upon it is diminished or increased. The levers I I and I' I' being connected with each other through the pins $f$ and the lever Q, it follows that any movement of one must occasion or be attended by a corresponding and equal movement of all the other levers of the series and that as a consequence the platform N must rise and fall equally at all points. Hence no matter where the load may be placed upon the platform its weight will be divided between the two springs and it will be accurately indicated upon the dial-plate Y.

The dial-plate Y is preferably set at an angle or downward inclination, as shown in Figs. 1, 2, and 8, so that it shall be convenient to read in whatever position the truck may be placed.

It will be seen upon referring to Figs. 2, 3, and 4 that the frame F' and the journal-boxes M are so located that the arms $a$ of levers I' shall fall within the legs or supports D in all positions of the truck. This arrangement serves in a measure to protect the levers I' I' against injury.

It will of course be understood that the castings or legs O are provided with seats or bearings in the upper walls or sides of the openings P to receive the conical points J, said seats being of such form and dimensions as to permit a free rocking of the legs upon the points.

A clear distinction is to be made between wagons and carts provided with weighing mechanism and a weighing hand-truck. A hand-truck when resting upon its feet assumes a nearly-horizontal position; but when taking on a cask, barrel, or box it assumes an inclination of approximately forty-five degrees to the horizon, while under varying circumstances or conditions of use it may take any intermediate angle. It is desirable that the weighing shall be performed with equal facility and accuracy in whatever position the truck may assume, and this end I attain by the construction set forth. Wagons, carts, cars, and the like, when provided with weighing mechanism, usually, if not invariably, require to be brought to a level or horizontal position, or practically so, and are commonly provided with means for raising and lowering the supporting or suspending devices to place the weight of the platform upon the lever mechanism for weighing or upon the main frame for carrying purposes. In all such constructions such main frame precludes any save an exceedingly-limited inclination on the main frame, though the lever system has in some instances been suspended from supports carried by such frame and allowed a play sufficient for weighing purposes. So far as I am aware, however, no one has before devised or suggested a weighing hand-truck capable of weighing in any position which it is likely to assume in ordinary use. Having perfected such a construction I mean to claim it somewhat broadly as contradistinguished from weighing carts, wagons, and the like, having the limitations above noted. In other words,

Having thus described my invention, what I claim is—

1. In a weighing hand-truck, the combination of a main frame; a platform; levers upon which said platform is supported; and pendulous frames carried by the main frame and in turn supporting the levers, said frames being free to swing in the direction of the length of the truck, whereby the levers are caused to maintain at all times their correct weighing position.

2. In a weighing hand-truck, the combination of a main frame; pendulous frames carried by said main frame and free to swing lengthwise thereof; levers fulcrumed in the pendulous frames; connections between said levers whereby they are caused to move in unison; a platform carried by said levers; a counterbalance acting upon the levers in opposition to the platform; and an indicating device connected with the levers and serving to indicate the load carried by the platform.

3. In combination with a main truck-frame; pendulous frames F and F' carried thereby; levers I I and I' I' fulcrumed in said frames; springs K and K' connecting the levers of the respective frames; lever Q connected with one lever of each frame; pointer X connected with lever Q; and dial Y located in reading relation to the pointer X, substantially as shown.

4. In combination with main frames; pendulous frames carried thereby; connected levers I I fulcrumed in the pendulous frames; a platform supported by said levers; a spring connecting said levers; an indicator; and a lever connected with said indicator and also connected with a lever of one of the pendulous frames at a point in axial alinement with the journals or supports of said frame, whereby the movements of the lever may be transmitted to and shown by the indicating device regardless of the raising or lowering of the main frame.

5. The herein-described weighing-truck, comprising the following elements in combination: a main frame; pendulous frames F and F' carried thereby and provided respectively with levers I I and I' I' connected in pairs; springs K and K' connecting the levers of each pair; lever Q fulcrumed upon the main frame; rods R and R' connecting the lever Q with one lever of each pair; an indicator connected with and adapted to be actuated by the lever Q; and a platform N resting upon the levers, substantially as set forth.

6. In a weighing hand-truck, the combination of a main frame; pendulous frames F and F'; levers carried by said pendulous frames; a counterbalance and an indicator connected with said levers; and a platform mounted upon said levers and adapted to rock thereon as the frame is raised or lowered.

7. In combination with a truck adapted to be raised and lowered at one end at will, a lever system pendulously supported therein and free to assume and to maintain at all times a vertical position regardless of the inclination of the main frame; and a platform carried by said lever system, movable relatively to the truck-frame, and free to rise and fall under variations of load, substantially as set forth.

8. In combination with a main truck-frame; pendulous lever-frames carried thereby; a pair of balance or weighing levers carried by each of said frames; springs connected with the levers of each pair; a lever fulcrumed at a point between the two frames and connected with a lever of each pair at points in axial alinement with the pivots of said frame; and a platform carried by the weighing-levers.

9. In combination with a truck and a weighing-lever system comprising two swinging lever pairs, substantially such as described; a lever Q connecting the two sets of levers; a casting U provided with stops T' and T² to limit the movements of said lever Q, and with a graduated dial Y; and a pointer X connected with lever Q, and movable over said dial.

10. In combination with a truck having a main frame provided with a double weighing-lever system and having a transmitting-lever Q extending from one pair of levers to the other and to the rear of the main truck-frame; a rod or slide $S^2$ connected with said lever Q; a toothed sleeve V secured upon said rod; a dial Y; and a pointer X having a toothed hub or pinion W to mesh with the toothed sleeve V, substantially as and for the purpose set forth.

11. In combination with levers I, I; pendulous supporting-frames for said levers; platform N carried by said levers; spring K connecting the levers; and an adjusting device L interposed between the levers and the spring and movable with said levers, substantially as and for the purpose set forth.

12. In combination with a hand-truck and with levers I, I, and I', I', their pendulous supports, and their springs K and K', intermediate lever Q connecting levers of the two pairs and in plane with the axis of the pendulous support, substantially as described, whereby the four levers are caused to move in unison, regardless of tipping or inclination of the truck.

13. In combination with a truck-frame; pendulous frames supported in said frame; weighing-levers fulcrumed in said pendulous frames; and a platform provided with legs or castings having openings P to receive the ends of the weighing-levers and with seats for the bearing-points of said levers.

14. In combination with levers I, I, having arms $a$, $b$, and $c$; a platform supported upon the arms $a$; a pin or coupling connecting the arms $b$; and a spring connecting the arms $c$, all substantially as described and shown.

In witness whereof I hereunto set my hand in the presence of two witnesses.

HARRY SAWYER.

Witnesses:
J. G. EMERY, Jr.,
OTTO ALBERT.